Feb. 13, 1934.  R. E. RILEY  1,947,173
METHOD OF MAKING A MOLDED RUBBER SHOE
Filed May 24, 1932
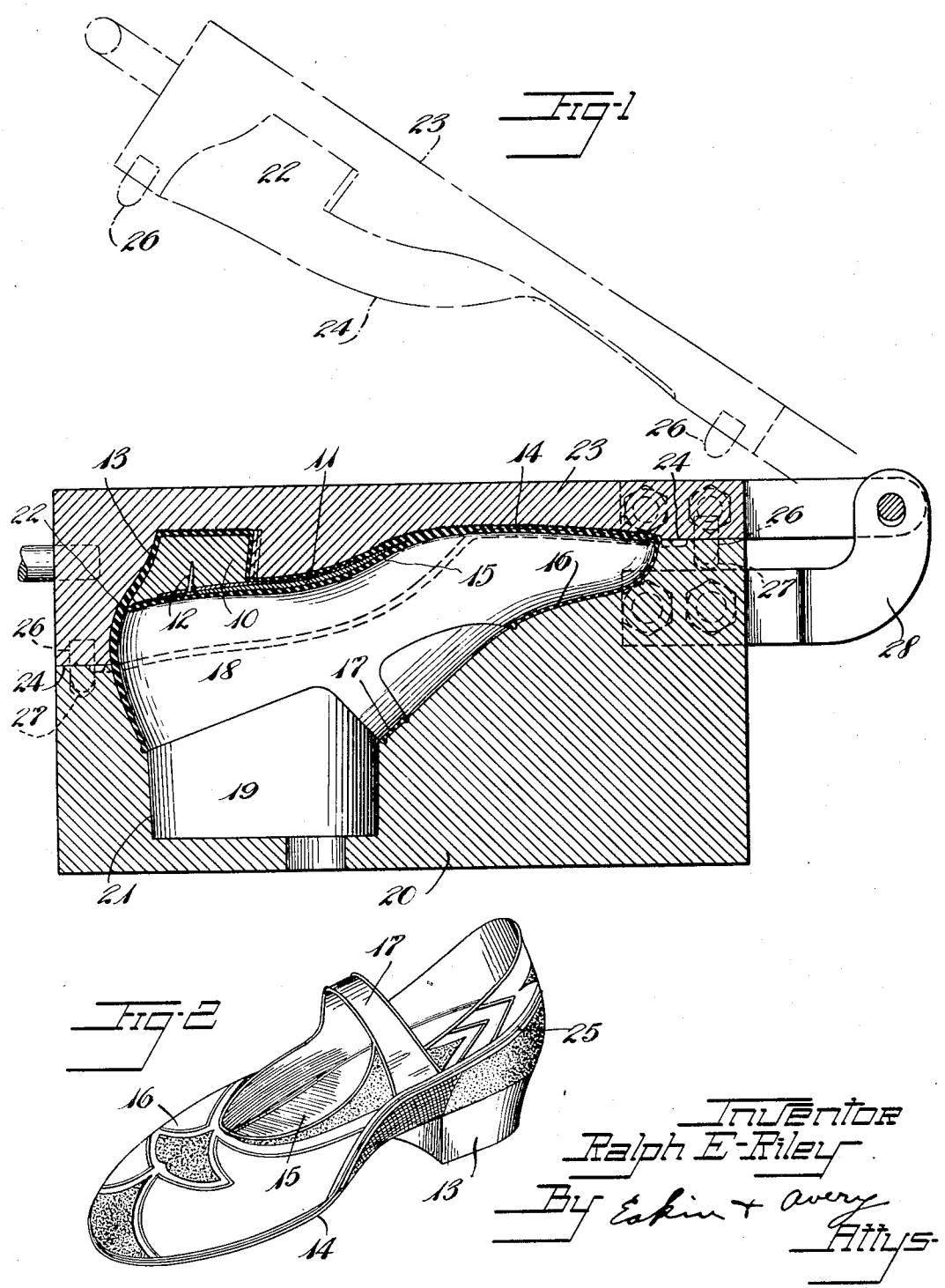

Patented Feb. 13, 1934

UNITED STATES PATENT OFFICE 1,947,173

METHOD OF MAKING A MOLDED RUBBER SHOE

Ralph E. Riley, Akron, Ohio, assignor to The B. F. Goodrich Company, New York, N. Y., a corporation of New York Application May 24, 1932. Serial No. 613,202

1 Claim. (Cl. 18—59)

This invention relates to rubber shoes and methods of making the same. It is especially adapted to the manufacture of bathing shoes and the like.

The principal objects of the invention are to provide a molded, unseamed article which will neatly conform to the foot of the wearer, and one which will be impervious to moisture to provide simplicity and accuracy in manufacture, and to so ornament the surface of the article as to mask the mold parting lines and enhance the appearance of the article.

Other objects will appear from the following description and the accompanying drawing.

In the drawing:

Fig. 1 is a central longitudinal vertical section of a mold used in practicing the method, having a completed shoe therein, the external mold parts and the shoe being shown in section and the core or last being shown in elevation, the upper mold section being shown in full lines as being closed and in dot and dash lines as being partly opened.

Fig. 2 is a perspective view of the finished shoe.

Referring to the drawing, the shoe forming the subject of this invention comprises a solid heel filler 10 formed of wood or suitable composition, an arch stiffener 11 fastened to the heel filler as by nails 12, an impervious molded rubber heel covering 13, a molded rubber outsole 14, a molded rubber insole 15, and a one piece molded upper 16 integral with the outsole, insole, and heel covering. An ankle strap 17 may be formed integrally with the upper.

In order to provide for integrally molding the shoe without the formation of rinds or mold parting marks over the toe and heel portions of the upper, molding members are provided comprising a last or core 18, conforming in shape to the interior of the article and having a shank 19 extending beyond its molding surface, and a two part mold, one section 20 of which is provided with a cavity 21 into which the shank 19 snugly fits for accurately positioning the last. The heel and sole portions of the shoe are formed by a cavity 22 in mold plate 23. Mold plates 20 and 23 are separable along a parting surface 24 which extends along the upper edge of the sole from the toe to the ball and then extends along the path of maximum horizontal bulging of the last approximately to the heel portion of the upper.

The mold plates may be engraved to provide an ornamental surface on the article. In order to mask the presence of a rind or parting mark where the plates meet and to facilitate trimming of the rind, the plates are so engraved as to provide an ornamental and reinforcing rib or band 25 along the parting line on the shoe.

Dowel pins 26 and sockets 27 are provided for aligning the mold plates, which may be hinged together as by hinges 28.

In building a shoe the heel 10 and attached arch stiffener 11 are covered with sheets of unvulcanized rubber and placed in position on the core, or in the heel cavity in the upper mold plate. The upper may be cut from sheet material and applied to the core or pieces of sheet rubber sufficient to form the upper are placed in the cavity of the mold plate 20. The core or last 18 is then placed in the cavity with its shank 19 engaging the opening 21 provided therefor. The mold plate 23 is swung into closed position and heat and pressure are applied. The rubber material flows together under influence of the heat and pressure to form a homogeneous article. Any excess rubber material escapes along the parting face 24 to an overflow cavity provided therein about the mold cavity. The rubber portions completely surrounding the heel insert and arch stiffener seal these parts so as to prevent their contact with moisture when the shoe is in use.

After the shoe is removed from the mold the rind along the parting line is trimmed and the shoe is ready for use. Any trimmed rind occurring along the ornamental band 25 will be less noticeable by reason of the presence of the band, giving the shoe the appearance of an article molded without parting of the mold along the upper.

By carrying the parting line along the upper above the sole, a neat-fitting article naturally concave on its inner surface around the sides and back of the shoe is made possible without the occurrence of parting lines over the toe of the shoe.

The resulting article is free from seams and porous places such as occur in bathing shoes made by other methods where the rubber is not confined between mold members, and the rubber is more firmly united to the heel filler.

I claim:

The method of making a molded rubber shoe which comprises completely enclosing a heel filler and an arch stiffener by molding a rubber composition about them, excess rubber being permitted to escape along a parting line following the path of maximum horizontal bulging of the shoe, and simultaneously forming an ornamental band along the line of parting to mask the parting line.

RALPH E. RILEY.